UNITED STATES PATENT OFFICE.

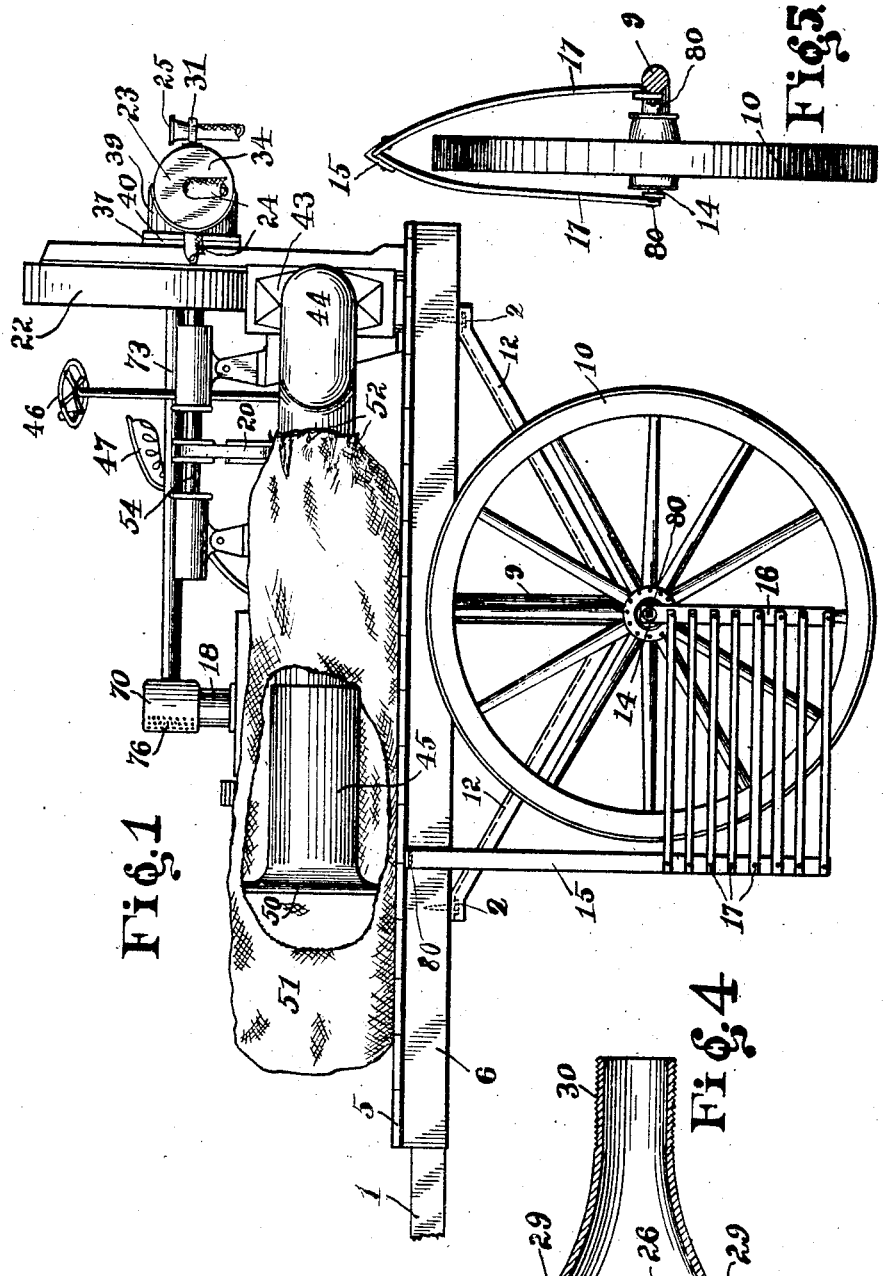

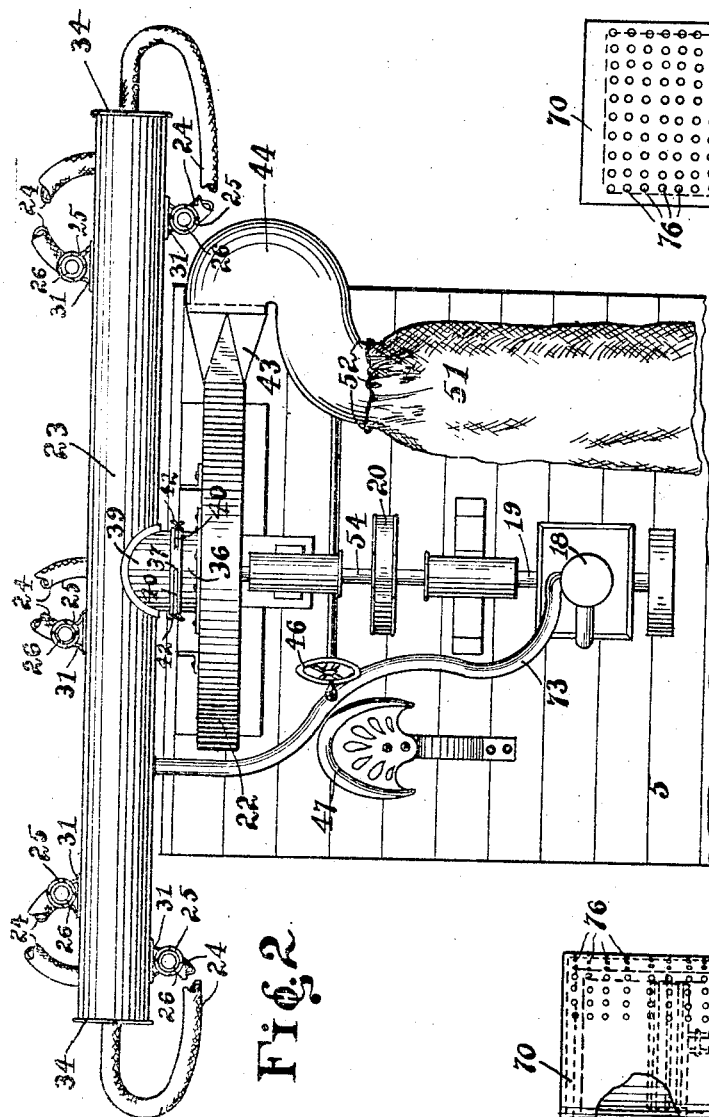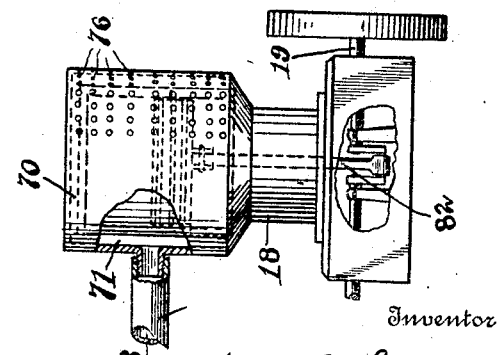

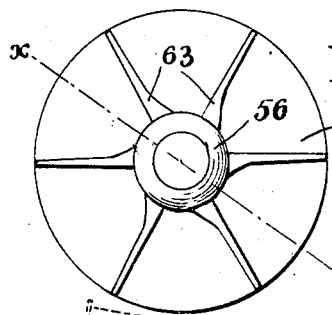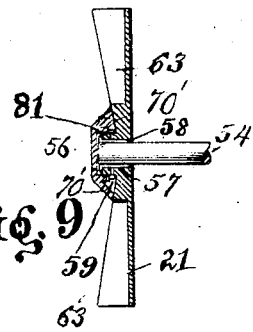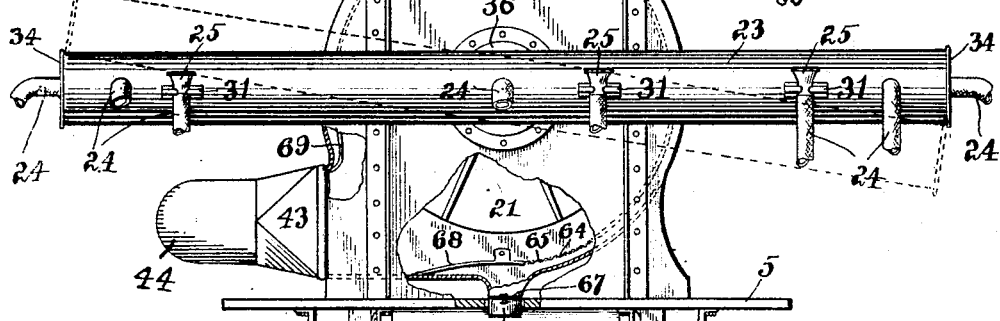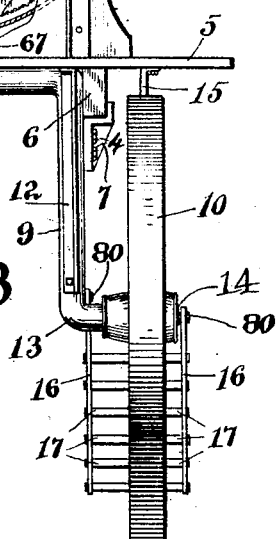

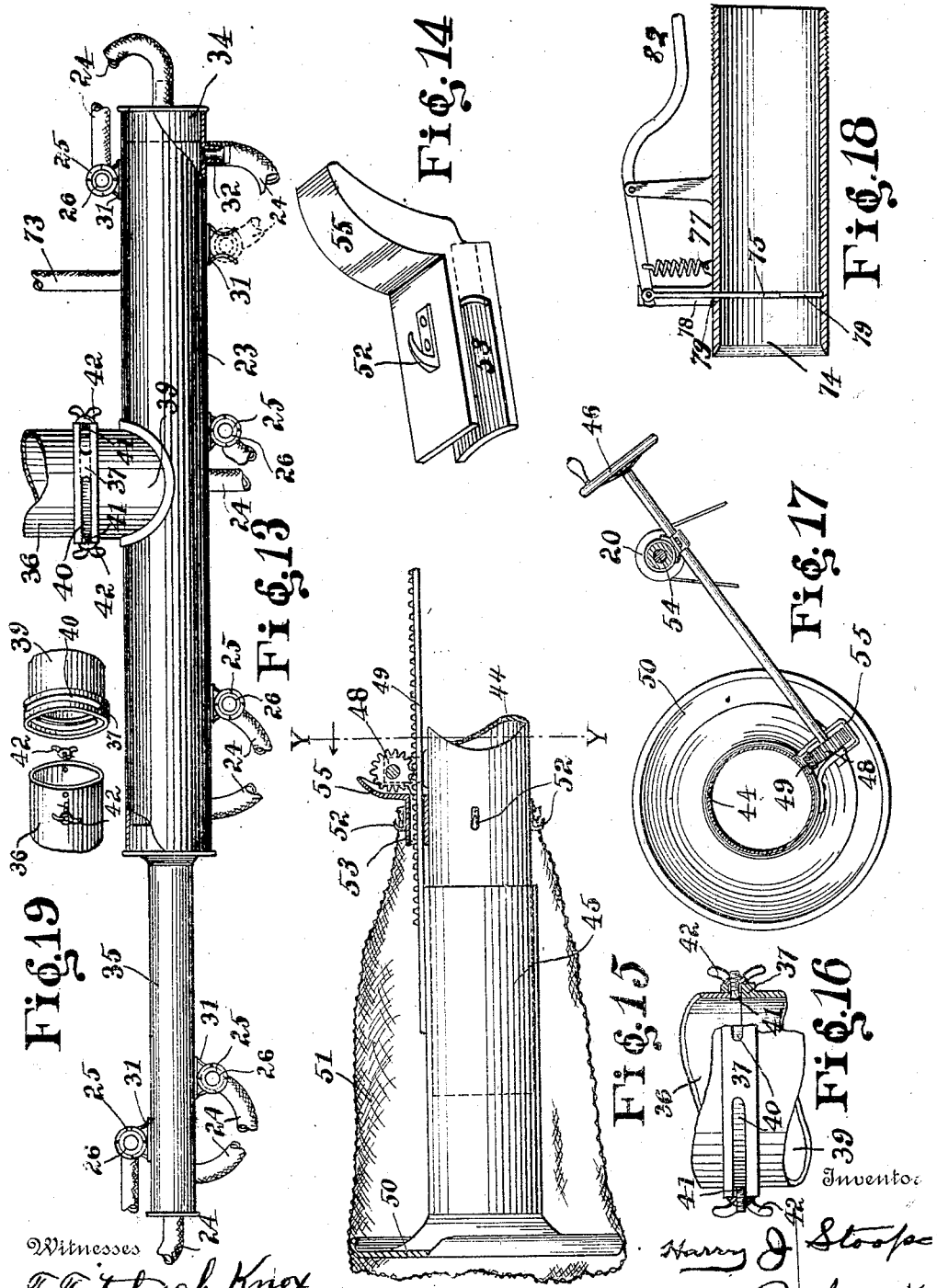

HARRY JAMES STOOPS, OF HOUSTON, TEXAS.

COTTON-PICKING MACHINE.

969,419.   Specification of Letters Patent.   Patented Sept. 6, 1910.

Application filed October 9, 1909. Serial No. 521,840.

*To all whom it may concern:*

Be it known that I, HARRY JAMES STOOPS, a citizen of the United States, residing at Houston, in the county of Harris and State of Texas, have invented certain new and useful Improvements in Cotton-Picking Machines; and I do hereby declare the following to be a full, clear, and exact description of the invention, such as will enable others skilled in the art to which it appertains to make and use the same.

This invention relates to cotton picking machines using suction and blast fans and cotton picking tubes to draw the bolls of cotton from the plants and pack the cotton into sacks. Its chief objects are to guard the plants against injury, to draw all the matured cotton satisfactorily from the bolls, to insure picking all the cotton in cases where it has died before ripening, to guard against drawing in foreign matter into the sack, to dry the cotton during its passage thereto, to provide convenient means for cooling the engine and at the same time aiding in drying the cotton while making an auxiliary fan unnecessary; to provide convenient means for varying at will the lateral extent of the suction cylinder and the width of the strip picked over at each trip of the machine; to insure perfect packing of every part of each sack; to provide means for gradually withdrawing a filling tube which holds the sack diametrically distended, said means also serving to make said tube coöperate by mechanical pressure with the air pressure in such work of packing and generally to improve the action of the fan as an exhaust device and sack filling device and the details of the machine in general.

In the accompanying drawings Figure 1 represents a side elevation of a cotton picking machine embodying my invention; Fig. 2 represents a plan view of a part of the same; Fig. 3 represents a rear elevation of the same very slightly modified from the construction shown in Fig. 1; Fig. 4, a detail sectional view of one form of nozzle; Fig. 5, a detail plan view of a transporting wheel and its guard; Figs. 6 and 7, detail elevations taken at right angles to each other of the cylinder cooling cap and proximate parts; Figs. 8 and 9, detail views of the rotary fan and some appurtenances respectively in front elevation and in vertical central section; Fig. 10, a detail perspective view of one of the end caps of the suction cylinder; Fig. 11, a detail view of one of the nipple caps; Fig. 12, a detail view of a part of the perforated straining plate of the fan; Fig. 13, a detail view of the suction cylinder with one extension cylinder applied; Fig. 14, a detail view of the rack guide and guard; Figs. 15 and 17, detail views of the discharge-tube-extending devices; Figs. 16 and 19, detail views of the devices for varying the position of the suction cylinder; and Fig. 18, a modified form of valve.

The machine may be drawn either by draft animals or by a traction engine. In the former case the pole 1 carries a double tree and swingle tree to which the draft chains are applied as usual. Said pole is attached to the forward end of the machine truck composed of a wooden platform 5 resting on longitudinal beams 6 fastened by brackets 7 and their bolts 4 to the vertical sides of the arched middle part 8 of axle 9 of the two transporting wheels 10, that carry said truck cart fashion. The said middle part 8 has the form of an arch flattened on top so that its top (see Fig. 3) is at right angles to its two parallel integral sides. Said wheels run in the middle of the spaces between the rows next the row which the said axle straddles and the arched part 9 of the latter is high enough and broad enough to avoid brushing against the bolls of said row and to fit into the space between said beams, the latter being near the side edges of the truck. Two pairs of downwardly converging brace bars 12 are fastened at their upper ends by screws 2 or other convenient means to the said truck, such attachment being either to the beams 6 as in Fig. 1 or directly to the planks of the platform 5, as in Fig. 3. The lower ends of said bars 12 are attached to the said axle near the angles made by the vertical sides of arched central part 8 with the horizontal outer parts 13 of said axle, which terminate in journals or spindles 14.

To guard the branches of the plant from injury by the wheels 10 either by entanglement among their spokes or by being crushed by the tires, I employ a guard for the lower part of each wheel, said guard being as a whole V-shaped in horizontal section with the apex presented forward like the prow of a ship, so as to divide the overlapping branches of the two proximate rows and turn them aside gradually without injury. The vertical front bar 15 of this guard is attached at its upper end to the said truck and is V-shaped in cross-section, presenting a sharp ridge forward. The two vertical rear bars 16 of said guard are shorter than the front bar 15 and fastened respectively to the proximate horizontal part 13 of the axle or the vertical part thereof near it and to the corresponding spindle 14. All the fastenings of said three bars to other parts are detachable, screws or bolts 80 being preferably employed as most convenient. The sides of said guard are composed of horizontal bars or slats 17, arranged at intervals with openings between them, the forward end of each side bar 17 being attached to the front bar 15 and its rear end to the appropriate rear bar 16. The two sets of side bars of course converge forward and the lowest ones are high enough to avoid cotton hills and all irregularities of the ground.

Cotton has heretofore sometimes been picked by machines using suction nozzles presented to the bolls by pickers walking behind it. My machine is operated in accordance with this principle by means of an engine 18 of any suitable kind operating an exhaust fan 21 through a main shaft 19, fan shaft 54 and any suitable gearing 20. I do not describe nor show these power applying devices 18, 19 and 20 and their appurtenances in detail, for they are not relevant to my present invention, but are indicated, as the fan must be driven by some means, most conveniently located on the platform near it as shown. Said fan 21 is provided with a fixed casing 22 approximately of the usual form and its inlet passage 36 connects with a long hollow suction cylinder 23 attached rigidly to the rear of said truck, but extending considerably beyond the same on each side and provided with several flexible hose suction pipes 24 each having at its outer end a detachable bell-mouthed suction nozzle 25. The length of the suction cylinder 23 and of the individual pipes enable the pickers to cover a considerable belt or strip of the field at each passage and the pipes 24 and nozzles 25 are sufficiently numerous to permit a proper number of pickers to operate at once, for effectually clearing of cotton all the rows in said strip or belt without delaying the machine.

Each nozzle 25 has an annular inwardly tapering knife 26 detachably fastened to screws 27 that pass through corresponding annular peripheral flanges 28 and 29 of said parts. The tapering body of said knife is within said mouth and it serves as a guard to prevent in some degree the escape of cotton in case of any defect of the suction, but its most important service is to cut the stem of each boll until said stem is broken or the cotton is wholly drawn therefrom by the force of the suction. This cutting is effected by a slight backward movement of said nozzle operative at any angle by reason of the circular form of the knife edge and the inward taper of the blade. This nozzle being provided with said knife will pick cotton from plants which have died (for example by frost) before the maturing and opening of the bolls. In dealing with living plants such picking of unripe cotton will be of course generally unadvisable as it should be left to ripen for a later occasion; but when frost or any other agency has killed many plants it becomes important to save the cotton in the unopened bolls. The detachability of the knife allows it to be sharpened conveniently. Screw threads 30 are provided on the shank or neck of said nozzle to permit its ready detachment from the hose or suction pipe for purposes of repair or cleaning.

The suction cylinder 23 is provided with spring clamps 31 in the neighborhood of the attachment of each suction pipe 24, to hold the nozzle 25 of the latter and the proximate part of the hose, when not in use. Each clamp 31 as shown consists of two curved springs, which hold the suction pipe or the neck of the nozzle against the face of said cylinder when said neck of pipe is forced between them. Each suction pipe is fitted on a nipple 32 projecting from cylinder 23, which nipple may be covered by a cap 33 in case the suction pipe or hose is removed for any considerable length of time. Less power is required to effectively operate the machine when the opening of the nipple is thus closed than if it were left open. The ends of the cylinder 23 are closed by caps 34 unless provided with extension cylinders 35 which may be substituted for them or for either one of them. Each cap 34 or extension 35 is tightly fitted into an end of the cylinder and will be held by suction when in use without other fastening. It may also be provided with one of said nipples 32 for a suction pipe. The advantage of the extension cylinder 35 as a substitute for such cap is that it practically elongates the end of the cylinder 23 on that side of the machine, since said extension cylinder is itself provided with two or more nipples and suction pipes and the spring clamps for the nozzles of the latter. When an extension cylinder is applied in this way to each end of the main cylinder the machine is capable of dealing at one passage with a much greater number of rows than before; but may readily be reduced to its former width for entering a doorway or to avoid any out of door obstacles or for any other purpose of convenience by removing said extension cylinders and putting said caps 34 in their places.

To permit at will the adjustment of cylinder 23 from horizontal to any inclined position or even into a vertical position the rear end of the air-inlet passage 36 (Figs. 2 and 19) leading to the fan fits within an annular flange 37 on the proximate end of the lateral outlet tube 39 of said cylinder, said outlet tube being rigidly and permanently fixed to the latter. Flange 37 is slotted at 40 in line with its circumference to allow the axial adjustment of said air-inlet passage or tube section 39, with consequent tilting of said suction cylinder, these parts being clamped in any position to which they may be adjusted by the protruding screw stems 41 and thumb-nuts 42 or any similar device. Thus the cylinder may be tilted and clamped again at will to suit uneven growth of the crops or inclination of the ground or convenience in passing through doorways or along narrow lanes or wagon roads in the woods when even a slight reduction of the lateral space required may have an advantage.

The fan 21 has an outlet 43, which fits the end of a tube 44, on which a second tube 45 of greater diameter is arranged telescopically so as to be extensible. To extend or draw back tube 45, I make use of a hand wheel 46 near the driver's seat 47, the inclined stem of said wheel being provided with a pinion 48 meshing with a longitudinal rack 49 rigidly attached to and moving with the tube 45; the tubes 44 and 45 thus provided, collectively constituting a bag-filling conduit longitudinally extensible and contractible at the will of the occupant of the said seat with little effort. The outer end of the tube 45 is provided with an annular external flange 50, adapted to fit within a large sack 51 shown in Fig. 1, the diameter of the bag and flange being almost exactly the same. In use, this flange is at first near the bottom of the bag and the blast from said fan carries the cotton through said tubes 44 and 45 into the small space then existing between the end of the tube 45 and the sack bottom, entirely filling said space with closely packed cotton and distending radially that part of the bag. The operator then turns said wheel and rod in a direction to make said pinion draw back said rack and tube 45 very slightly, again offering a small space to be filled. This operation is repeated frequently as the filling progresses, until the bag is quite full. At any stage of this work and as often as may be needed the action of the wheel may be reversed to force forward said tube 45 and said flange, thus by solid mechanical pressure reinforcing the pressure of the blast and making the packing perfect.

The material of the sack is open enough to permit the escape of air through the fabric, leaving the cotton behind and within the sack. The mouth of the sack during the filling operation is attached by hooks 52 to tube 44 and the guide and guard 53 as best shown in Fig. 15. The rack 49 is of sufficient length to protrude, even at the beginning of the operation, through the mouth of the sack and is engaged by said pinion outside of the same. Said track guide 53 guards said rack 49 from entanglement with the sack and has a curved pinion shield 55 on its end. The precise construction of the suction fan is obviously not essential to my invention, nor to the operation of my cotton picker. A convenient form is shown in Figs. 8 and 9 in front and side view, the blades 63 being integral with the central part or hub 81, from which they radiate. This hub is of course bored at 58 to receive one of the ends of fan-shaft 54, which end protrudes through the inner side of said hub. Keys 57 (Fig. 9) fasten the hub and shaft together, fitting in grooves of the hub and shaft and held there by screws 70'. These screws and keys and the said end of the shaft are covered and protected by a cap 56, which is provided on its inner face with an internally screw-threaded integral collar or annular flange 59, the same being screwed on the similarly threaded end of hub 81. Without said cap, wet or unripe cotton would be likely to cling to the parts which it covers, hence the necessity of substituting a smooth surface such as the outer face of said cap; while its removability permits ready access to said parts. The blades of said fan are strengthened by thickening their material at 63 on the rear side near the hub. Said fan is surrounded peripherally at all points except at the outlet or discharge 43 for supplying the sack filling tubes by a nearly annular guard 64 of sheet metal having many perforations 65 at all points except near said outlet. At the bottom of the fan casing I supply a pocket 66 and a gate 67. When cotton is wet or dirty the water is strained through the perforated plate 64 and descends to this pocket. Fine sand and dirt will also escape through perforations 65 taking the same course and all such foreign matter may be easily removed by opening said gate, so that the blast may immediately blow it out of the casing. The plate 64 follows the outline of said casing. Near the discharge it is left imperforate for a short space at both ends 68 and 69, the imperforate part being longer on the underside of the exhaust than on its upper side. The object of this is to avoid all risk of drawing the water or dirt from said pocket up through the plate 64 and blowing it out with the cotton into the sack.

A casing 70 incloses the cylinder of engine 18 leaving a cooling air space 71 between them. One side of this casing is provided with many perforations 76 and from the opposite side of said casing a suction pipe 73 extends to suction cylinder 23. The action of the fan through the latter, draws the cold air through said perforations into said space, where it cools the cylinder and is heated in so doing. Thence it passes to said cylinder 23 and aids in drying the cotton drawn into and through the same. If a water-cooled engine be employed, of course the same means may be employed for cooling the water-pipes in the radiator, or if there are several cylinders they may all be treated in the same way; the casing being simply varied in shape and size to suit the radiator or group of cylinders. This method of engine cooling enables me to dispense with the additional or auxiliary fan or equivalent means heretofore used in such machines for engine cooling. Its action is regulated by the speed of the engine and fan and hence is automatically compensating according to the need of the mechanism. The means used therefore are simple, light and cheap. The same draft of air cools the engine and dries the cotton, and this is part of the same suction of the fan which draws the cotton from the bolls.

A nozzle with a knife is obviously unnecessary when no stems need to be cut; so, in many instances other forms of nozzles than that marked 25 may be substituted without disadvantage, for example cylindrical nozzle 74 (Fig. 18) having a valve 75 operated by a lever 82 and spring 77 and working through a raised guide 78 and slot 79 in the top of said nozzle near its inlet end to open or close this end at will. This nozzle is especially intended to be used in gathering cotton which has remained long after maturing; so that there are many dead leaves which would be drawn with or after the cotton into the suction pipe and cylinder but for the interposition of said valve. The latter may, however, be dispensed with when the cotton has not been left too long. In its normal condition it will readily be drawn when ripe from the bolls without any intermingling of other material or any need either for a valve or knife.

The operation has been described in detail. The fan driven by the engine draws air from the suction cylinder and connected pipes and thus sucks in the cotton while cooling the engine and using the air thus heated to dry the cotton, and simultaneously and continuously blows the cotton into the sack and in packing the cotton is aided by the telescopic tubes and hand-actuated tube withdrawing and extending mechanism as set forth.

It would obviously be possible to substitute some other form of exhausting device for the fan, (for example a pump) but the means illustrated are found to be the best for the purpose, and fans only are applied to any appreciable extent in practical use.

The word cylinder, as applied herein to the suction cylinder, is not designed to confine the latter to cylindrical form. It is a hollow elongated receptacle for the cotton from the cotton picking suction tubes on the way to the fan and its form in cross section is immaterial except as a matter of strength, convenience and creditable appearance.

In ordinary use the bell-mouth form of nozzle without the knife, or for smaller bolls the cylindrical form without the valve, is satisfactory. Said knife and valve are chiefly useful for the special occasions stated; though the knife will help retain the cotton if the suction should fail and weaken and the valve partly closed will do likewise. If quite closed it makes a perfect bar against escape.

Having thus described my invention what I claim as new and desire to secure by Letters Patent is:

1. A suction nozzle for cotton picking machines having an annular knife in its outer end.

2. A suction nozzle for cotton picking machines having a detachable annular knife in its outer end.

3. A suction nozzle for a cotton picking machine having an inwardly inclined annular knife at its outer end.

4. A suction nozzle for a cotton picking machine having a bell form mouth and an inclined annular knife extending inwardly as set forth.

5. A suction nozzle for a cotton picking machine having a bell form mouth provided with an annular exterior flange and a knife having a corresponding flange detachably fastened thereto, said knife being annular and tapering in form and extending back into said mouth so as to present its edge in an inclined position substantially as set forth.

6. In combination with a fan and a suction cylinder connected thereto, suction tubes for cotton picking connected to said cylinder and tubular connections between the fan casing and cylinder provided with means for regulating the position of the cylinder in a vertical plane.

7. In combination with a suction cylinder of a cotton picking machine, mechanism for exhausting the same, and a suction tube or tubes attached to said cylinder, tubular means of connection between said cylinder and exhausting means, said connecting means being adapted to hold the cylinder at different angles as adjusted substantially as set forth.

8. In combination with the suction cylinder of a cotton picking machine and the suction fan and transporting truck thereof; a pair of tubes which fit endwise together, being attached to said fan and cylinder respectively and permitting the rotary adjustment of the tube attached to said cylinder for varying the inclination of the latter, one of said tubes being circumferentially slotted, and the other of said tubes being provided with screw-threaded means extending through such slot or slots for clamping said cylinder as thus adjusted.

9. In combination with a suction cylinder and cotton picking tubes of a cotton picking machine, a device for exhausting the same, an engine for operating said device, a casing surrounding said engine and leaving a space between them and a pipe running from said suction cylinder to said space to draw cool air over and around the engine.

10. In combination with a suction cylinder and cotton picking tubes of a cotton picking machine, means for exhausting said cylinder, an engine for operating said means, and means for cooling said engine having tubular connection with said cylinder and operated by the suction thereof.

11. In combination with a suction cylinder, cotton picking tubes and driving engine of a cotton picking machine, a casing surrounding said engine and provided with air admitting perforations, a tube extending from said casing to said cylinder and adapted to draw the outer air through said holes into said casing and around said engine for cooling the same and means driven by said engine for exhausting said cylinder.

12. In combination with a hollow part to which a cotton picking tube is attached, an engine cooling suction tube also connected to said hollow part, means for exhausting the latter driven by said engine and a casing connected on one side to said engine cooling suction tube and having perforations in its opposite side, to permit a current of air to be drawn across the interior of said casing for cooling the engine substantially as set forth.

13. A rotary fan in combination with cotton-picking suction tubes and nozzles, cotton packing devices supplied by said fan and a truck supporting and transporting the foregoing elements, said fan having a casing which is provided at its bottom with a pocket for waste material and a discharge gate and also provided with inlet and discharge openings, a guard peripherally surrounding said fan except at said discharge opening, said guard being provided with perforations at all points except in proximity to said discharge opening, but left imperforate on the under side of the latter to prevent water and other matter from being drawn out of said pocket through the perforations of said plate into the outflowing cotton.

14. In combination with a cotton discharging device a telescopic extensible and contractible conduit receiving the cotton from said discharging device and conveying said cotton to the sack, devices for extending and shortening said conduit at will as set forth and the truck of a cotton-picking machine, on which the aforesaid parts are supported and transmitted.

15. In combination with a cotton discharging fan having a casing provided with an outlet, a tube connected to said outlet, a second tube movable over the first one means arranged to be operated by hand for extending or withdrawing this second tube at will and the truck of a cotton-picking machine on which the aforesaid parts are supported and transported.

16. In combination with the transporting truck of a cotton picking machine a fan adapted to suck in and discharge cotton, and a longitudinally movable tube supplied thereby, provided with a flange adapted to distend a sack within which it is located and with means for moving said tube longitudinally, said fan and tube being mounted on and transported by said truck.

17. In combination with a fan adapted to suck in and discharge cotton, a tube connected to the outlet of said fan and receiving cotton therefrom, a second tube telescopically connected to the first for longitudinal contraction and extension, means for thus moving this second tube longitudinally, the outer end of the latter being provided with an external annular flange and the transporting truck of a cotton picking machine, by which the foregoing parts are carried for the purpose set forth.

18. In combination with a fan discharging cotton, a tube connected to its outlet, a second tube extensible and contractible longitudinally thereon and provided with a longitudinal rack, a pinion engaging said rack, a hand-wheel and rod provided with said pinion to operate said rack and tube and the truck of a cotton picking machine which carries the foregoing parts substantially as set forth.

19. In combination with a fan discharging cotton, a tube connected to its outlet, a second tube sleeved telescopically thereon and extending beyond the same, a rack on this second tube, a guard and guideway for said rack a pinion a guard for said pinion, hand-operated devices for turning the pinion to operate said rack and tube and the truck of a cotton-picking machine which carries the foregoing parts.

20. In combination with a fan and suction cylinder exhausted thereby, a series of suction tubes connected to said cylinder and a series of detachable nozzles for said tubes, each nozzle having an open outer end at least equal in diameter to the rest of the nozzle adapted to be applied to the bolls for removing the cotton therein and provided with fixed though detachable annular knives for cutting the stems of cotton bolls substantially as set forth.

In testimony whereof, I have signed my name to this specification in the presence of two subscribing witnesses.

HARRY JAMES STOOPS.

Witnesses:
E. W. TOWNES,
N. S. HEWIT.